United States Patent [19]

Tagawa et al.

[11] 4,435,733
[45] Mar. 6, 1984

[54] FLYING SPOT SCANNER FOR LASER PRINTER

[75] Inventors: Takao Tagawa, Kashihara; Toshio Urakawa, Yamatokoriyama, both of Japan

[73] Assignee: Sharp Kabushiki Kaisha, Osaka, Japan

[21] Appl. No.: 352,151

[22] Filed: Feb. 25, 1982

[30] Foreign Application Priority Data

Feb. 27, 1981 [JP] Japan ............................ 56-29033

[51] Int. Cl.³ ............................................. H04N 1/24
[52] U.S. Cl. ..................................... 358/302; 358/293; 358/347
[58] Field of Search ...................... 358/293, 302, 347

[56] References Cited

U.S. PATENT DOCUMENTS

| | | | |
|---|---|---|---|
| 3,946,150 | 3/1976 | Grafton | 358/293 |
| 4,034,408 | 7/1977 | Starkweather | 358/293 |
| 4,040,096 | 8/1977 | Starkweather | 358/293 |
| 4,044,197 | 4/1978 | Starkweather | 358/293 |
| 4,213,157 | 7/1980 | DeBenedictis | 358/302 |
| 4,253,724 | 3/1981 | Minoura | 358/347 |

*Primary Examiner*—Howard W. Britton
*Attorney, Agent, or Firm*—Birch, Stewart, Kolasch & Birch

[57] ABSTRACT

A flying spot scanning system adapted for a laser printer is characterized in that a laser generator provides a laser beam having a cross section of an ellipse whose longitudinal axis is defined by the surface of the laser generator emitting the laser beam, a first lens receives and passes through the laser beam having the elliptic cross section toward a laser reflector, a second lens receives the laser beam having the elliptic cross section from the laser reflector, the laser beam along a direction orthogonal to the surface of the laser generator being incident upon a longitudinal side of the second lens which modifies the laser beam to a cross section of an approximate circle to a substantially focused spot on the surface of a light sensitive medium. Preferably, the first lens comprises an axially symmetrical focus lens and the second lens comprises a cylindrical lens.

11 Claims, 4 Drawing Figures

FLYING SPOT SCANNER FOR LASER PRINTER

BACKGROUND OF THE INVENTION

The present invention relates to a flying spot scanning system for communicating video information to a scanned medium, and more particularly to a scanning system comprising a rotating polyhedron mirror for controlling a scanning laser beam.

Recently, improved recording devices called "laser printers" have been gaining popularity and have been meeting with commercial success. The major function of "laser printers" is importing visual data such as letters and pictures etc. derived from a computer, a word processor, a facsimile device etc. to a scanned medium in the form of an electrostatic charge pattern. A laser beam functions as scanning light.

An example of the "laser printers" is disclosed in Starkweather, U.S. Pat. No. 4,034,408 issued July 5, 1977, entitled "Flying Spot Scanner". The disclosure of this patent is incorporated herein by reference. However, in the conventional laser printers, a He-Ne gas laser is provided in which case an acousto-optical modulator is needed for modulating a laser beam in conformance with video signal information as disclosed in U.S. Pat. No. 4,034,408. The provision of the acouto-optical modulator resulted in loss of the laser beam when a laser device with a high intensity laser beam is needed.

To eliminate the need for such a modulator, a conventional laser printer comprising a semiconductor laser diode has been investigated. The conventional laser printer requires a collimating lens, a beam expander lens and an f-θ characteristics imaging lens (f: focal length θ: inclination angle) which are very costly to thereby make the laser printer expensive and often impractical.

Thus, it is desired to develop at a practicable cost laser printer comprising the semiconductor laser diodes.

SUMMARY OF THE INVENTION

Accordingly, it is an object of the present invention to provide an improved laser printer comprising a semiconductor laser diode.

It is another object of the present invention to provide an improved flying spot scanning system suitable for a laser printer comprising a semiconductor laser diode. Briefly described, in accordance with the present invention, a flying spot scanning system adapted for a laser printer is characterized in that a laser generator provides a laser beam having a cross section of an ellipse whose longitudinal axis is defined by the surface of the laser generator emitting the laser beam, a first lens receives and passes through the laser beam having the elliptic cross section toward a laser reflector, a second lens receives the laser beam having the elliptic cross section such that an element of the laser beam along a direction orthogonal to the surface of the laser generator is incident upon a longitudinal side of the second lens which modifies the laser beam to a cross section of an approximate circle to a substantially focused spot at a surface of a light sensitive medium.

Preferably, the first lens comprises an axially symmetrical lens and the second lens comprises a cylindrical lens.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Figure 1:
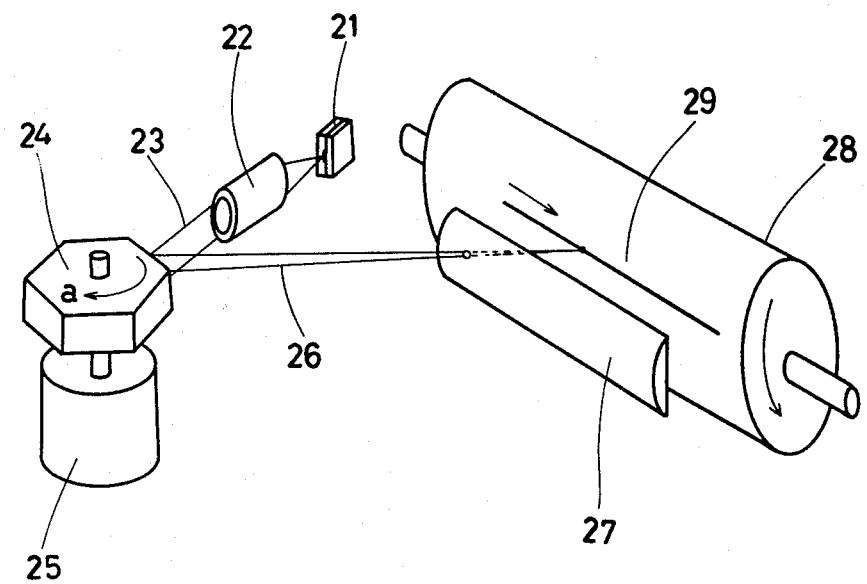
FIG. 1 shows a flying spot scanning system according to the present invention.

With reference to FIG. 1, a flying spot scanning system comprises a semiconductor laser diode 21, a focus (convergence) lens 22, a polyhedron mirror 24, a motor 25, a cylindrical lens 27, and a scanned medium 28.

The scanned medium 28 may be a xerographic drum which rotates consecutively through a charging station such as a corona discharge device. The laser beam from the rotating polyhedron mirror 24 traverses a scan width on the drum 28. Usable images are provided and information content of the scanning spot is represented by the modulated or variant intensity of the laser beam respective to its position within the scan width. The scanned spot dissipates the electrostatic charge in accordance with its laser intensity. When the laser diode 21 is turned on and off to modulate the laser beam according to the video information signal to be recorded, the presence and absence of the scanned spot forms a pattern in conformance with the video signal information.

The electrostatic charge pattern thus produced is developed in a developing station and then transferred to the final copy paper. In this manner, the information content of the scanned spot is recorded on a more permanent and useful medium. Of course, alternative prior art techniques may be employed to cooperate with a scanned spot in order to utilize the information contained therein.

The polyhedron mirror 24 is continuously driven by the motor 25 and synchronized in rotation to a synchronization signal representative of the scan rate used to obtain the original video signal. The rotation rate of the xerographic drum 28 determines the spacing of the scan lines. It also may be preferable to synchronize the drum 28 in some manner to the signal source to maintain image linearity. The source image is reproduced in accordance with the signal and is transferred to printout paper for use or storage.

Thus, the flying spot scanning system can be adapted for the so-called laser printer. The semiconductor laser diode 21 may be selected to be a laser diode having a circular laser emission portion within about 2–3 μm. Such a laser diode can be a double heterojunction GaAs-GaAlAs diode (DH-type) having an emission portion of about 3 μm or a buried heterojunction diode (BH type).

Figure 2:
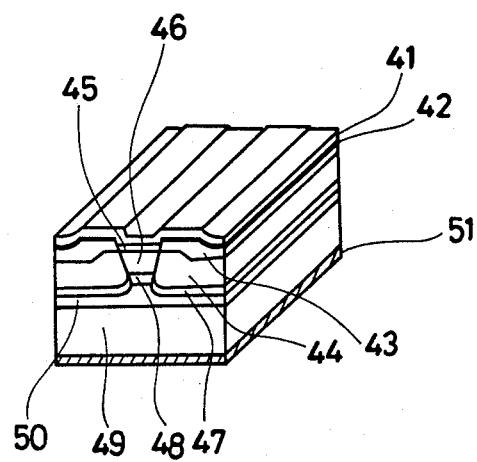
FIG. 2 shows an example of a BH type laser diode adapted for the flying spot scanning system as shown in FIG. 1.

FIG. 2 shows an example of the DH type laser diode. In the DH type laser diode an InP layer is provided for burying both sides of a double heterojunction, the InP having a refraction index lower than that of an InGaAsP layer as an active layer. The laser emission region is limited to enable an oscillation of a transversal single mode.

The laser diode of FIG. 2 comprises a Cr/Au layer 41, an SiO$_2$ layer 42, an N-type InGaAsP layer 43, an N-type InP layer 44, a P-type InGaAsP cap layer 45, a P-type InP clud layer 46, a P-type InP block layer 47, an InGaAsP active layer 48, an N-type InP substrate 49, an N-type InP buffer layer 50, and a Cr/Au layer 51.

Since the width of the active layer for providing the oscillation of the transversal single mode is very limited, an emission point is narrowed and becomes similar to a complete circle.

The beam emitted from the laser diode 21 is focused with the focus lens 22 to form an impinging light beam 23. The beam 23 is reflected by the polyhedron mirror 24 which is rapidly driven by the motor 25 in a direction denoted as a around a central axis. A reflected beam 26 is applied to the scanned medium 28 through the cylindrical lens 27 along a scanning line 29.

Figure 3:
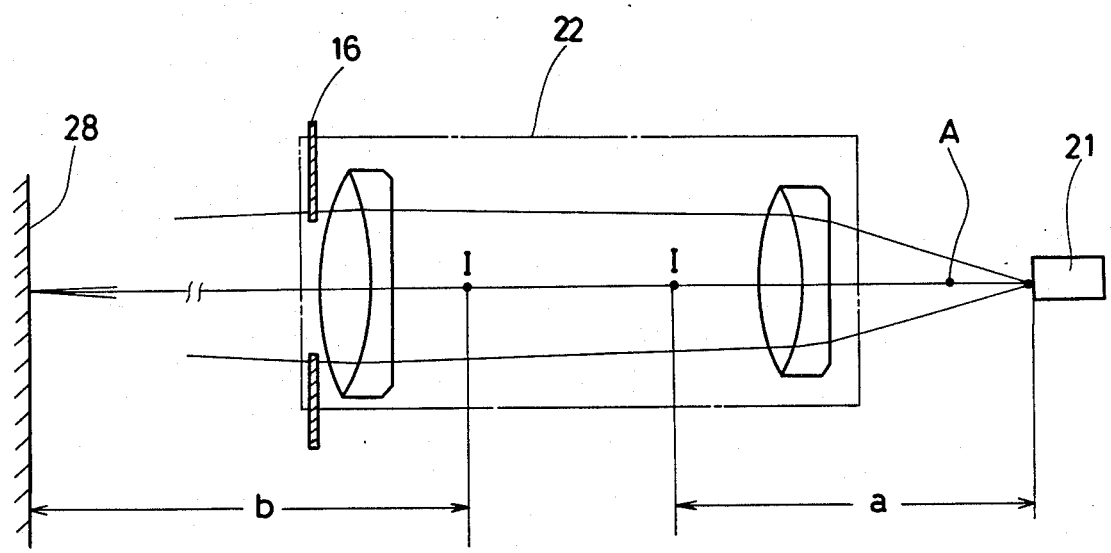
FIG. 3 shows a configuration of a focus (convergence) lens adapted for the system as shown in FIG. 1.

FIG. 3 shows a configuration of the focus lens 22 comprising a combination of a pair of concave-convex lenses in axial symmetry. The laser emission surface of the laser diode 21 is placed outside the focal point, referred to as A in FIG. 3, of the focus lens 22 and the emission point of the laser 21 focuses on the scanned medium in accordance with the following condition:

$$\frac{1}{a} + \frac{1}{b} = \frac{1}{f}$$

where
- a: the distance between the diode 21 and the focus lens 22
- b: the light-path distance between the lens 22 and the scanned medium 28
- f: the focal length of the lens 22

Preferably, the focus lens 22 comprises lenses having a large value of a numerical aperture (NA) so it can transfer as large a beam as possible from the diode 21.

However, as the NA value becomes larger, the focal length becomes shorter to make a magnification of the lens system larger. Then, the spot on the medium 28 becomes larger. When the pupil diameter of the lens system is large, the beam diameter at the polyhedron mirror is also large reducing the portion of the beam amount reaching the medium 28. When the beam diameter is larger than the width of one of the polyhedron surfaces, the laser beam may impinge upon other surfaces of the polyhedron to thereby cause random reflection and poor quality of the recorded image.

Therefore, the diameter of a pupil 16 is preferably similar to the width of the polyhedron mirror 24. If the width of the mirror 24 is large, the weight thereof is also large so as to make accurate control of the mirror 24 difficult. The pupil diameter of the lens system is preferably about 10 mm.

The NA value of the focus lens 22 is about 0.15 or more. Preferably, it is about 0.25. The focal length of the lens 22 is preferably about 10–30 mm. Below about 10 mm, the magnification of the lens system becomes large to reduce resolution of an image to be formed on the scanned medium 28. Above about 30 mm, the distance between the lens 22 and the laser diode 21 is long to make the NA value small so that the portion of the beam used is reduced and the recording speed slows down.

In the focus lens, a scanning position y is defined depending on a rotation angle $\theta$ as follows:

$$y = f \tan \theta$$

As the laser beam nears the periphery of the scanned medium 28, scanning speed increases to cause a distortion or aberration. To amend this aberration the speed of clock signals applied to the laser diode 21 is varied between the time the scanning laser beam is incident upon the center of the scanning line 29 and the laser beam is incident upon the periphery of the line 29. For recording the periphery of the line 29, the speed of the clock signals is relatively rapid but for recording the center of the line 29, the speed of the clock signals is relatively slow.

It is ideal to continuously vary the clock speed from the center of the line 29 to the periphery of the line 29. But, a step-wise change containing, for example, 3–5 steps is in practice adequate to obtain a good recorded picture. To change the clock speed, a buffer memory can be provided in the laser printer for storing information for at least a single line when information is continually applied to the laser printer at a predetermined rate. Then, the speed of information output from the buffer memory can be varied when transferred into the laser diode.

The polyhedron mirror 24 comprises a plurality of mirrored surfaces for reflecting any illuminating light beam impinging upon them. The width of each of the mirrored surfaces is about 10 mm for example. Although it is preferable that a tilt agle of each of the mirrored surfaces is accurate, it is unnecessary to use such accurate-tilt angle mirrored surfaces of the polyhedron mirror 24, according to the present invention, due to the cylindrical lens 27. The tilt angle refers to the degree of parallelism between the accuracy of the rotating axis of the polyhedron mirror 24 and the respective mirrored surfaces. When the tilt angle of the respective mirrored surfaces is the same, no problem appears. But, when the tilt angles of the respective mirrored surfaces are different from each other, critical problems appear.

According to the present invention, the critical problems owing to the inaccurate-tile angles of the mirrored surfaces of the polyhedron mirror 24 can be solved with the provision of the cylindrical lens 27.

Figure 4:
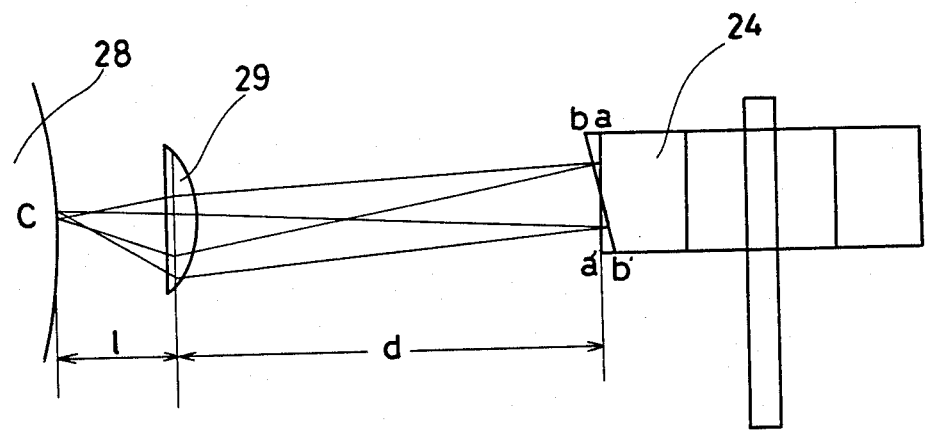
FIG. 4 shows an imaging condition of a laser beam upon a scanned medium according to the present invention.

FIG. 4 shows an imaging condition of the laser beam upon the scanned medium with the help of the cylindrical lens 27. The cylindrical lens 27 has a cross section having no curve in the longitudinal direction as shown in FIG. 4.

When the polyhedron mirror 24 rotates, reflecting the impinging laser beams, the laser beam incident upon the scanned medium 28 is not affected by lens 27 along the scanning direction. In a direction perpendicular to the scanning direction of the laser beam, namely, in the plane of the drawing of FIG. 4, the lens action is applied to the incident laser beam.

When the laser beams are reflected toward different directions by surfaces a–a' and b–b' of the polyhedron mirror 24, they are focused to a point c by the cylindrical lens 27. The laser beam orthogonal to the junction surface of the laser diode 21 is incident upon the longitudinal side of the cylindrical lens 27. As shown in FIG. 4, the cylindrical lens 27 comprises a plano-convex lens. The flat surface of the cylindrical lens 27 faces the medium 28. The cylindrical lens 27 is separated from the medium 28 by a distance, preferably about 15 mm, similar to the focal length of the lens 27, preferably about 15 mm.

The laser diode 21 emits the laser beam having a cross section of an ellipse where the longitudinal axis extends in a direction parallel to the junction surface of the diode. When such a laser beam passes through the axial symmetrical, focus lens 22, the focused spot also forms an ellipse.

As the cylindrical lens 27 is positioned, the following equation is satisfied in FIG. 4.

$$\frac{1}{l} + \frac{1}{d} = \frac{1}{f}$$

where
f: the focal length of the cylindrical lens 27
d: the length between the flat surface of the lens 27 and the mirrored surfaces of the polyhedron mirror 24
l: the length between the flat surface of the lens 27 and the surface of the medium 28

When $l<<d$, $l\approx f$ is needed to correct for the tilt angle difference.

Assuming that the focal length of the cylindrical lens 27 is less than 25 mm and $l=f$ is selected, the spot on the medium 28 is an approximate circle as a result of compression by the cylindrical lens 27. This is because the laser diode 21 is positioned so as to emit the laser beam having a cross section of the ellipse in the absence of cylindrical lens 27. As the focal length of the lens 27 is reduced, the compression rate increases. However, it is preferably 7.5 mm or more in view of lens manufacturing difficulties and the desired size of the scanned spot.

When the focal length of the lens 27 is more than 25 mm, the focusing effect along the longitudinal axis of the ellipse is not enough although the scanning error owing to the tilt angle difference can be amended with the condition of $l\approx f$.

Preferably, the focal length f of the focus lens 22 is about 22 mm, the NA value of the lens 22 is about 0.25, and the focal length f of the cylindrical lens 27 is about 15 mm.

As described above, in accordance with the present invention, the laser diode 22 is positioned so that the major axis of the elliptical cross section of the emitted beam is orthogonal to the longitudinal axis of the cylindrical lens 27. Even when the tilt angles of the respective mirror surfaces of the polyhedron mirror 24 differ from each other, the spot shape upon the medium 28 can be modified to be an approximate circle. The lens system comprises an axial symmetrical lens. Thus the flying spot scanning system of the present invention is not expensive. Even when an axis tilt up to about 0.01° is present in the polyhedron mirror 24, correction can be made. The image resolution is not reduced.

Preferably, the cylindrical lens 27 has a convex shape in both sides, a plano-convex shape or the like. The convex lens in both sides is superior to the plano-convex lens in capability. But, the plano-convex lens can be manufactured more easily and cheaply. When the flat side of the plano-convex lens faces the medium 28 and the convex side faces the rotating polyhedron mirror 24, the plano-convex lens can provide the same capability as the convex lens in both sides.

Because the convex side faces the polyhedron mirror 24, any reflected laser beams from the convex side are scattered and not returned to the laser diode 21 so that the laser diode 21 can be stably operated.

According to the present invention, a nonpoint light image provided by the semiconductor laser diode can be modified to a light beam having a circular cross section.

The invention being thus described, it will be obvious that the same may be varied in many ways. Such variations are not to be regarded as a departure from the spirit and scope of the invention, and all such modifications are intended to be included within the scope of the following claims.

What is claimed is:

1. Apparatus for recording the information content of an electrical signal on the surface of a light-sensitive medium by means of a plurality of scan traces across said medium, said apparatus consisting essentially of:
a semiconductor laser diode for providing a light beam of high intensity modulated in accordance with the electrical signal supplied thereto, said semiconductor laser diode comprising a junction plane oriented in a first direction and emitting a beam having an elliptical cross section;
reflector means comprising a plurality of contiguous reflecting facets rotatable about a central axis;
means for rotating said reflector means about said central axis;
focusing lens means disposed between said semiconductor laser diode and said reflector means for focusing said elliptical beam and passing said elliptical beam to said reflector means;
wherein said reflector means reflects said elliptical beam toward said medium, and rotation of said reflector means causes said beam to scan across said medium in a second direction orthogonal to said first direction; and
cylindrical lens means disposed between said reflector means and said medium and having a longitudinal axis parallel to said second direction for receiving said elliptical beam, for modifying the cross section of said elliptical beam into substantially a focused circular beam, and for directing said circular beam to a selected scan line on said medium.

2. The apparatus of claim 1, wherein said focusing lens means comprises an axial symmetrical lens.

3. The apparatus of claim 1, wherein the distance between said cylindrical lens means and said light sensitive medium is substantially equal to the focal length of said cylindrical lens means.

4. The apparatus of claim 1, wherein the width of each of said plurality of contiguous reflective facets of said reflector means is substantially identical to the diameter of said light beam incident thereto.

5. The apparatus of claim 1, wherein said focusing lens means has a focal length of about 10–30 mm.

6. The apparatus of claim 1, wherein said cylindrical lens means has a focal length of about 7.5–25 mm.

7. The apparatus of claim 1, wherein said focusing lens means has a numerical aperture of about 0.15–0.25.

8. Apparatus as set forth in claim 1, wherein said semiconductor laser diode is positioned at a distance from said focusing lens means which is greater than the focal length of said focusing lens means.

9. Apparatus as set forth in claim 1, wherein said cylindrical lens means is of a convex shape on both sides thereof.

10. The apparatus of claim 1, wherein said cylindrical lens is of a plano-convex shape.

11. The apparatus of claim 10, wherein a flat side of said plano-convex cylindrical lens faces the surface of said light sensitive medium and a convex side of said plano-convex lens faces said reflector means.

* * * * *